May 31, 1966  G. W. VON HOFE  3,253,544
MANUFACTURE AND USE OF LABELS FOR
BOTTLES, CONTAINERS, AND THE LIKE
Filed May 18, 1962  6 Sheets-Sheet 2
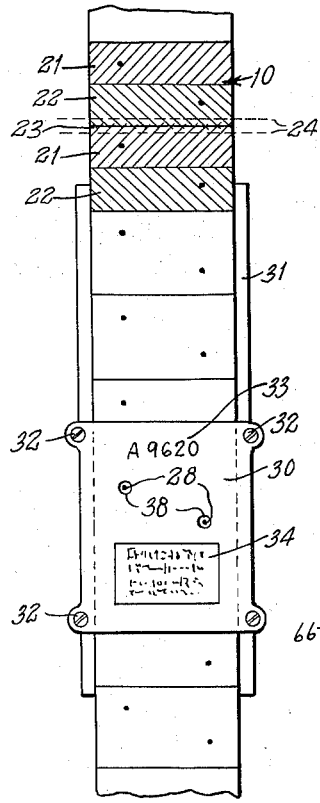
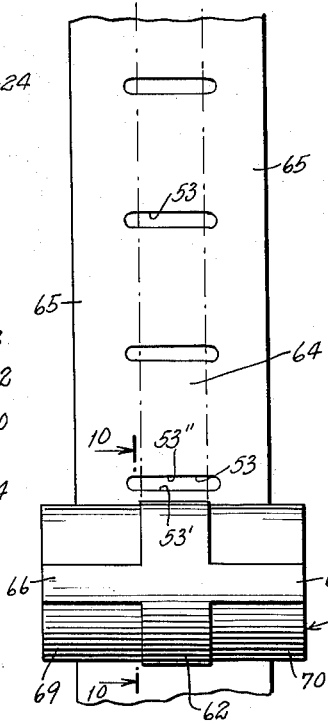
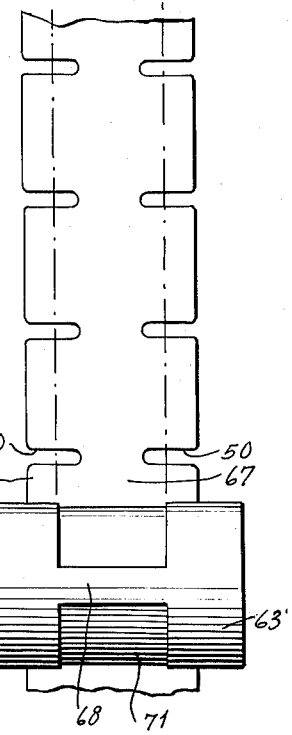
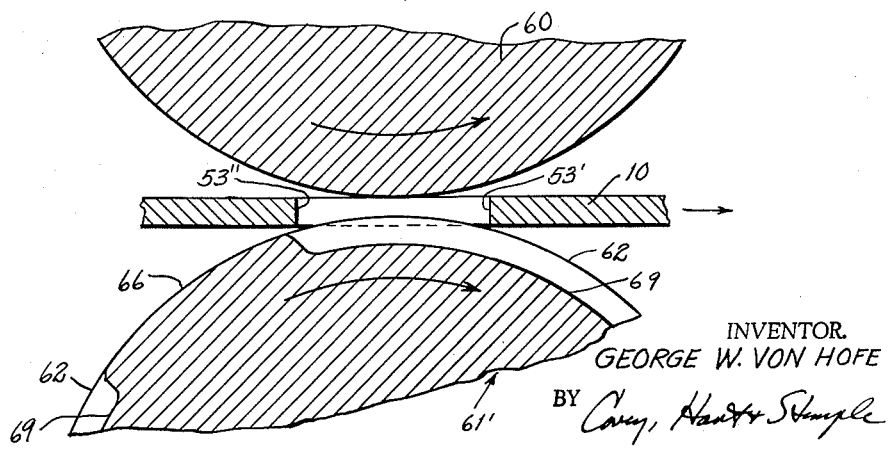
INVENTOR.
GEORGE W. VON HOFE
ATTORNEYS

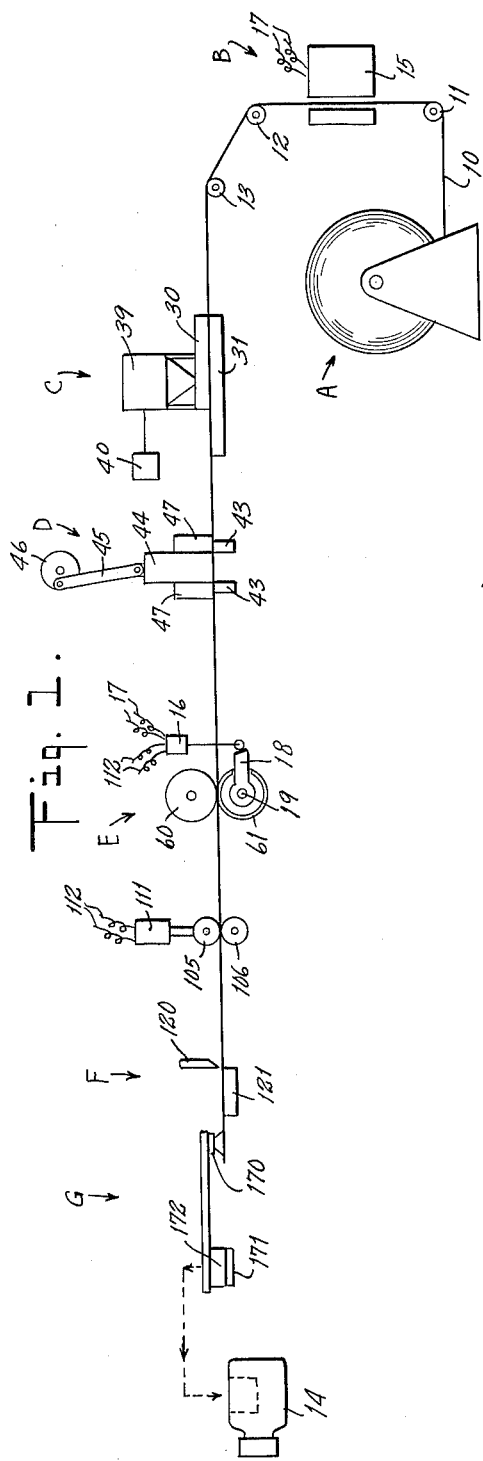
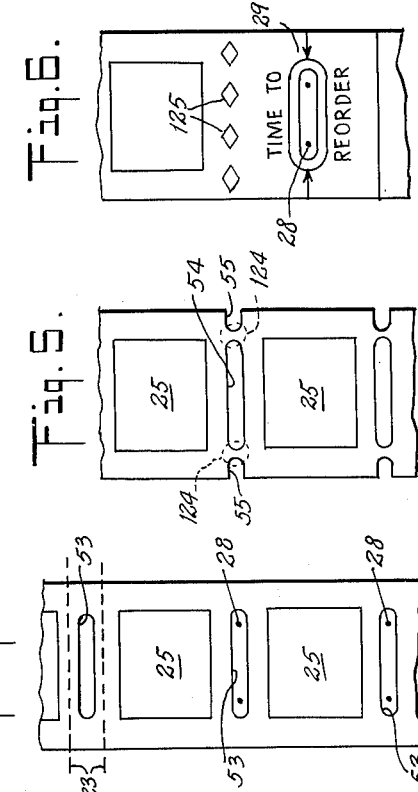
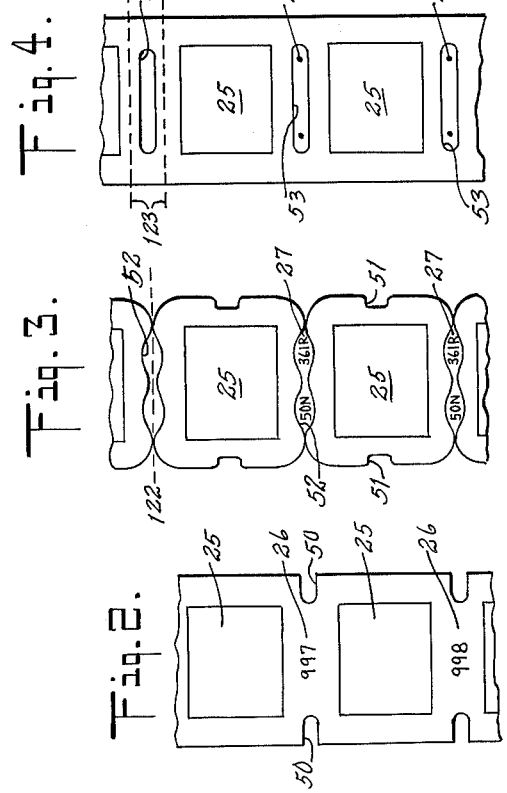
INVENTOR.
GEORGE W. VON HOFE
BY
ATTORNEYS

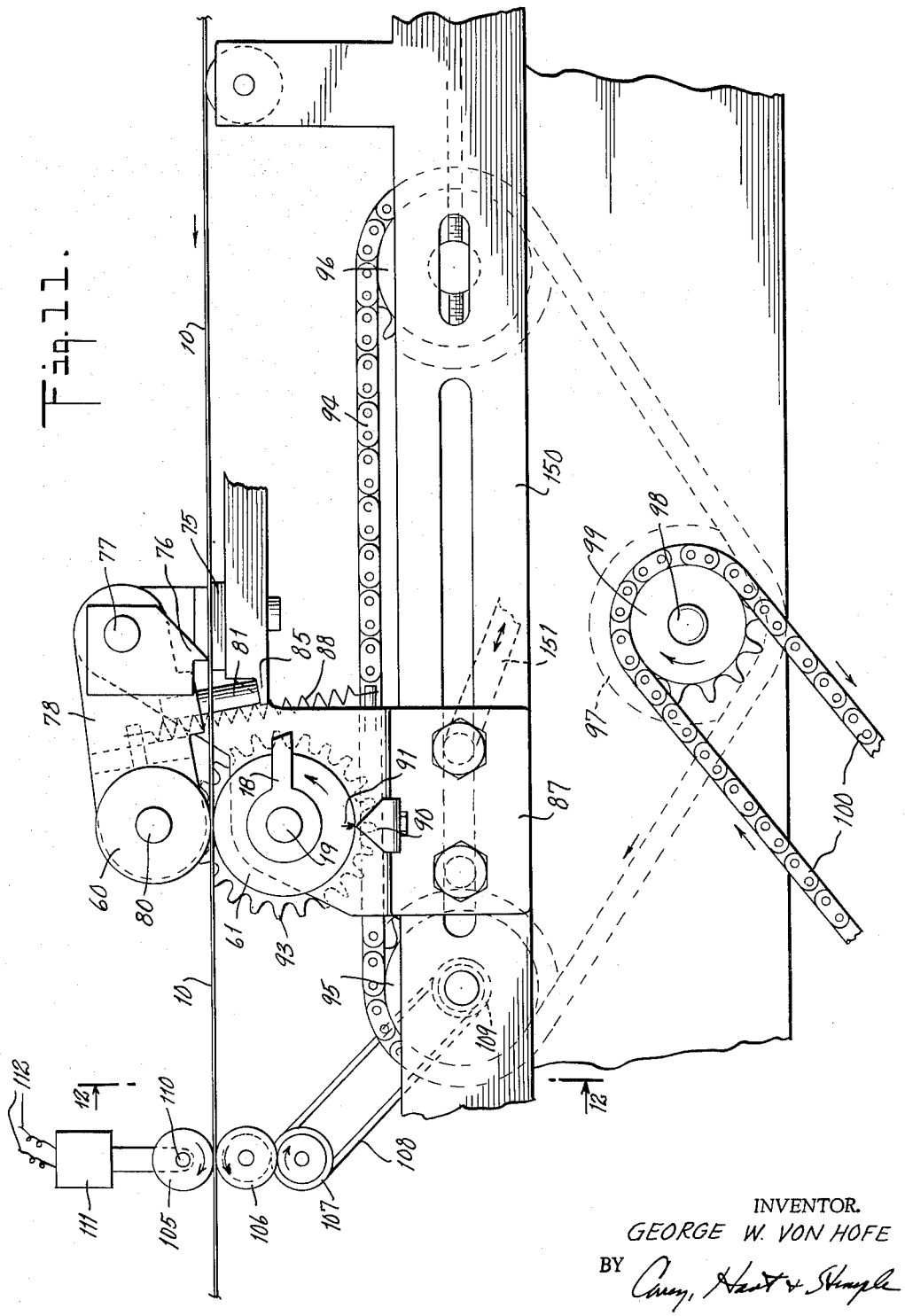

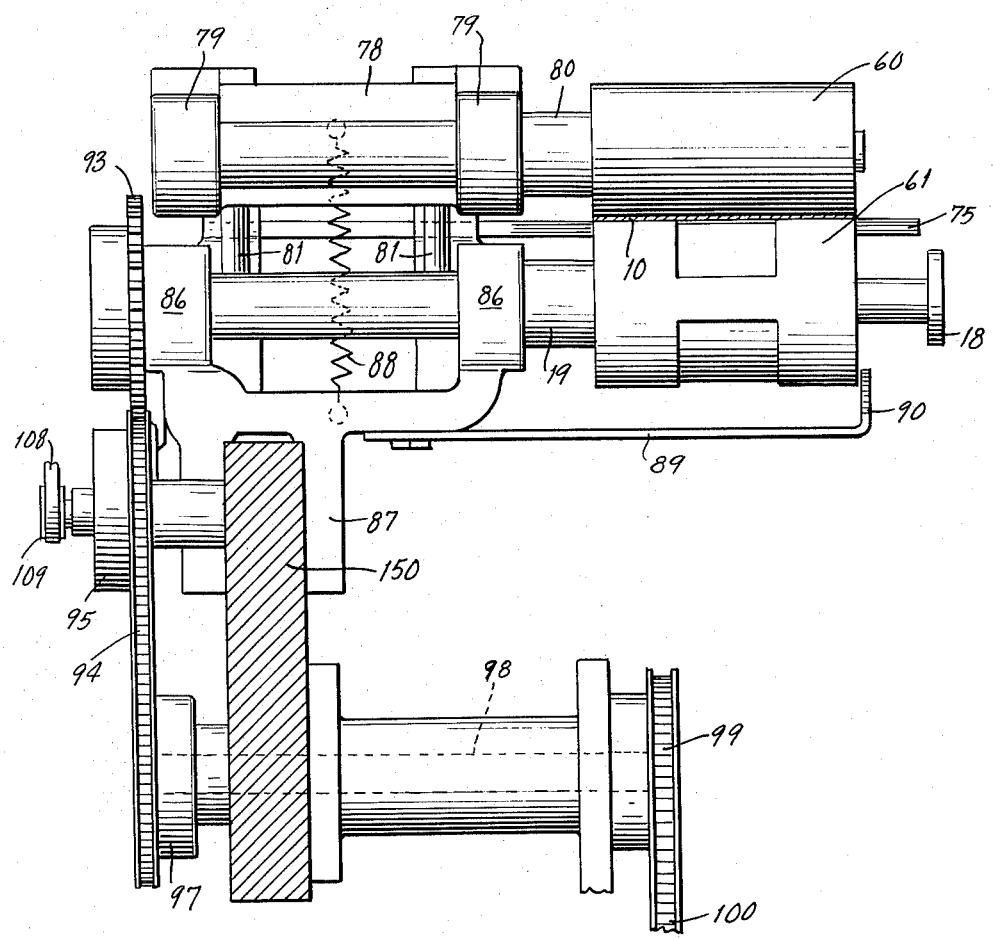

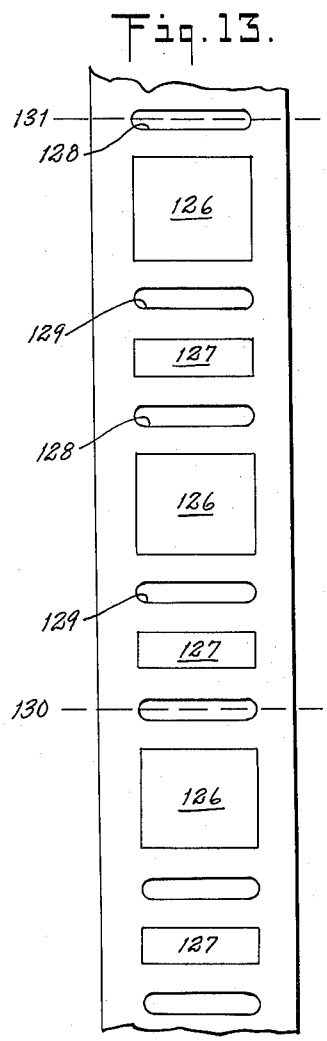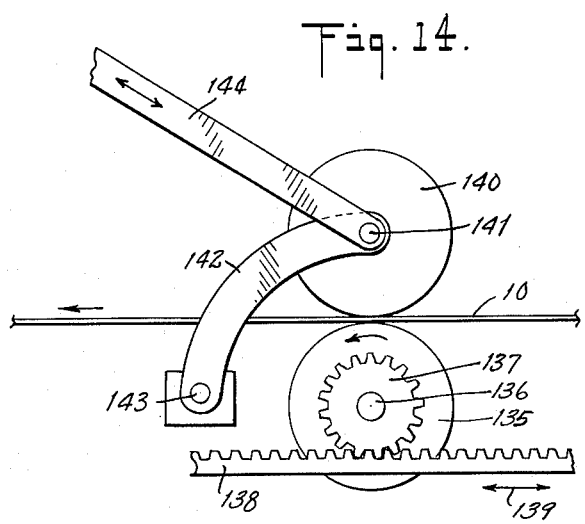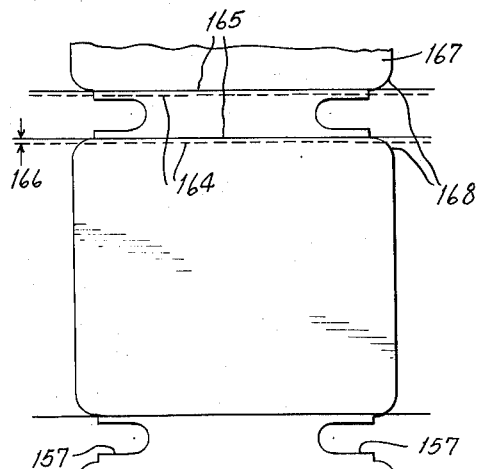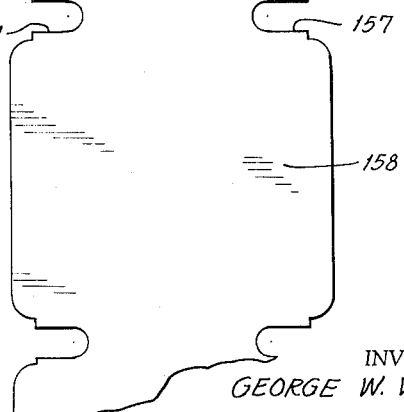

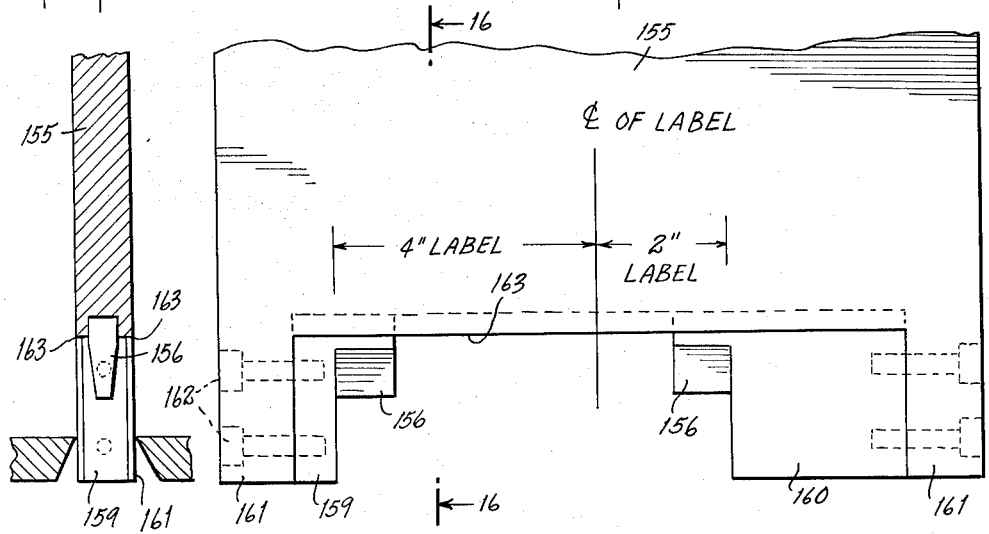
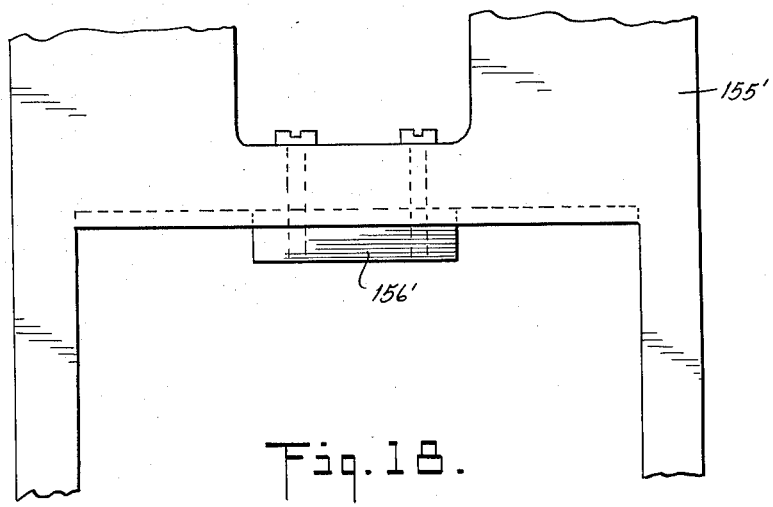
INVENTOR.
GEORGE W. VON HOFE

United States Patent Office 3,253,544
Patented May 31, 1966

3,253,544
MANUFACTURE AND USE OF LABELS FOR
BOTTLES, CONTAINERS, AND THE LIKE
George W. von Hofe, Millington, N.J., assignor to New
Jersey Machine Corporation, Hoboken, N.J., a corporation of New Jersey
Filed May 18, 1962, Ser. No. 195,744
12 Claims. (Cl. 101—426)

This invention relates to labels for articles such as bottles, containers, tubes, etc., and is particularly concerned with the manufacture of printed labels from a continuous web which may be coated on one side with a heat activatable thermoplastic material.

The great majority of the labels which are today employed in labeling bottles, containers and the like, are labels that are cut, stacked and then fed from the stack in the labeling machine to the articles to be labeled even though they might have been originally printed in web form. This wide use of the cut and stacked labels exists despite the many drawbacks resulting from handling them in this manner, such as, variation in size due to cutting methods, curling and sticking together of the cut labels, grain variations and mixes, their higher cost, etc. A further drawback is the impairment in the quality of cut and stacked labels caused by necessary handling. In addition to the many problems, which arise in attempting to obtain a positive and consistent operation of single labels from a stack in the machine hopper, there is the further very difficult problem of making absolutely sure that every label applied to a given run of articles contains exactly the same copy. This last is of the utmost importance to the drug and pharmaceutical industries for the wrong label on an article can be very costly and well-nigh disastrous to the business of a company which is unfortunate enough to make such a mistake. It is also of great importance to the insurance companies which furnish the product liability insurance coverage to the drug and pharmaceutical companies.

The labeling, drug and pharmaceutical industries have come to recognize that roll labels and roll-fed labeling machines offered the best solution to many of the problems which involve labels because of the possible controls, efficiences and economics that could result therefrom. However, the application to articles of labels from a roll involved many other problems which were difficult of solution. For example, there is the problem of obtaining accurately sized labels from a roll because of the variance in length of the web under changing atmospheric conditions and tension, and because of the difficulty of providing a feeding means which will at all times feed the exact amount of web in timed relation to other mechanisms and in relation to the printing area of the web. There is also the problem of obtaining from a web labels having a shape other than that of the usual square edge label, for example, a label having rounded corners which certain drug and pharmaceutical manufacturers insist on in the packaging of their goods because they remain securely in position on the bottles even when subjected to long periods of high humidity. Heretofore labels of this type have only been made by die cutting processes. Such accuracy is more difficult to obtain in roll labels because of the aforesaid variances, and can only be accomplished by maintaining cutting accuracies within thousandths of an inch in spite of such difficulties. Even the problem of label verification occurs in roll labels as a result of splices which are often necessary due to removals as a result of quality inspection, press breaks, splicing together various lengths to give proper roll diameter, etc., and the consequent possibility of different labels being connected together. In their efforts to overcome these problems, the labeling, drug and pharmaceutical industries expended a great deal of time and talent and substantial sums of money. Up to this time, the most successful approach to a solution of the problem has been through the utilization of light beams to control electronic devices. These devices, however, are complicated and costly and can only be employed by companies able to afford expensive machines and competent help. As a result, while the art is aware of the many possible advantages of roll labeling, the great majority of the companies using labeling machines in their business cannot afford the added costs of employing the up-to-date complicated roll label machines that will give them reliable precision labeling.

The principal purpose of the present invention is to provide an improved method of manufacturing roll labels and applying the same to articles, which method shall provide solutions to problems that heretofore made certain operations in the manufacture and application of roll labels difficult or even impossible, and shall be free of many of the disadvantages of known systems for manufacturing and applying labels to articles.

One of the objects of the invention is to provide a label and method of applying the same which will make it almost impossible to apply the wrong label to an article.

Another object of the invention is to provide a labeling machine which will automatically make and apply a given type of label to particular articles.

A further object of the invention is to provide a method of manufacturing and applying labels which will enable automatic verification of each label affixed to an article.

A further object of the invention is to provide an improved method of manufacturing and applying labels to articles that is capable of accomplishing its operations with the accuracy required to obtain exact registry of the labels with the several operating mechanisms.

A still further object of the invention is to provide improved means for feeding labels in a roll thereof to an operating instrumentality with exact preciseness.

Other objects of the invention, as well as the advantages and novel features thereof will become apparent from the following description when read in connection wiht the accompanying drawings, in which FIG. 1 is a diagrammatic view showing a method of manufacturing and applying labels which may be employed in carrying out the invention;

FIGS. 2 to 6 of the drawings are plan views of portions of a web illustrating the various operations that may be performed thereon by the mechanisms generally indicated in FIG. 1 of the drawings;

FIG. 7 is a plan view of the master plate located at the label verifying station;

FIG. 8 is a plan view of a feed roll and a portion of a web constructed in accordance with the invention, and illustrates how such roll cooperates with the cutouts in the web and an idler roll in the operation of the system;

FIG. 9 is a similar view showing how the feed roll may be constructed to process a web provided with cutouts of a different configuration than the cutouts shown in FIG. 8;

FIG. 10 is an enlarged detailed sectional view looking along the line 10—10 of FIG. 8 and illustrating the relation of the bight of the feed and idler rolls with a cutout in the web at a portion of the operation of the system;

FIG. 11 is a side elevational view of the mechanism for operating and associated with the feed rolls;

FIG. 12 is a front elevational view looking along the line 12—12 of FIG. 11;

FIG. 13 is a plan view of a portion of a web provided with two different labels for labeling the front and back of a bottle;

FIG. 14 is a detail in side elevation showing a modified form of the web feed mechanism;

FIG. 15 is a rear elevational view of the working portion of a double cut knife provided with registering means in accordance with the invention;

FIG. 16 is a vertical sectional view of the cutting knife shown in FIG. 15 and taken along the line 16—16 in the latter;

FIG. 17 is a plan view of a portion of a web on which is demonstrated the registering and cutting actions of the knife shown in FIGS. 15 and 16; and FIG. 18 is a view similar to FIG. 15 showing a modification of the registering means associated with the knife.

For a better understanding of the invention, attention is first directed to FIG. 1 of the drawings showing diagrammatically a form of label manufacture and application which may be employed in practicing the invention. In this drawing, the numeral 10 indicates generally the web which may be supplied in the form of a roll and which may consist of a blank strip made of one or more layers of the same or different materials and which may or may not have provided on it a layer of adhesive material such as a heat activatable thermoplastic. The roll is mounted at the station designated A in any suitable manner to permit a proper feed of the web 10 therefrom. Intermediate the guide rolls 11 and 12 is located a printing station B at which is provided printing mechanism for printing on the web 10 a series of label indicia, the printed areas bearing such indicia being either spaced or contiguous, as is desired. The mechanism at station B may also be employed for printing on the web dots or other code indications that may be employed for label verification.

The web 10 passes from station B and over guide rolls 12 and 13 to a station C at which means are provided for verifying that the labels fed therepast are the proper labels for the product that is to be labeled therewith. If the labels are accepted at station C they are fed forward to station D at which is provided a punching device for cutting slots in the web. These slots are employed to control the feed of the web by feeding rolls located at station E in advance of the slot punching device.

Beyond the feed rolls at station E, there are provided at station F, cutting instrumentalities for successively severing the terminal labels from the web. The severed labels are picked up by a label carrier at station G and applied to the proper bottle 14.

The printing mechanism 15 at the printing station B may be of any suitable construction known to the art and operated in the customary fashion to apply the desired printing material to the web 10 at each period of dwell of the web in its step-by-step feed through the machine. Preferably the operation of the printer is controlled by a microswitch 16 electrically connected to the printer by wires 17 and operable by a cam 18 carried by the shaft 19 of one of the feed rollers at station E. The cam 18 is adjustably mounted on shaft 19 to actuate the microswitch 16 and thereby to operate the printer 15 every time the cam comes to the position in its rotary movements at which the web 10 will be in a dwell position.

The printing mechanism 15 is preferably constructed in accordance with the invention to provide on the web 10 in each dwell period of the latter, a printed label area which may be spaced from the previously printed area a predetermined distance (note the printed areas designated 25 in the portions of the labels shown in FIGS. 2–6 of the drawings). The spaces between the labels can be utilized to simultaneously print in a numerical control such as the consecutive numbers designated 26 in FIG. 2 of the drawings. When the labels are so numbered the packer has an exact control of every label. Thus, by cutting out the numbered portions of the labels in the manner which will hereinafter be explained, and collecting such cut out label portions, the packer has a verification of the exact quantity of labels that has been consumed in any one day. This information is of especial importance to drug houses and can be equally useful in the packaging of other products.

As is indicated in FIG. 3 of the drawings, the areas between the labels can be used to provide thereon information which is useful solely to the production end of the business and not to sales or the customer. Thus, there could be printed in such spaces information such as indicated by the numeral 27 in FIG. 3 and which may give the quantity of labels printed in a given run, the date of printing of the labels, who the printer was, etc. This information, which is of no value to the consumer, will be neatly removed from the labels in the label severing operation.

The areas between the labels can be provided also with dots 28 in FIG. 4 or any other indicia which are utilized in the system as a means for verifying the label and controlling the operations of various mechanisms in the system as will hereafter become more clear. Inasmuch as the number and arrangement of the dots or other indicia in the spaces between the label may be varied quite extensively, many different labels of the same size may be verified with safety.

As is shown in FIG. 6 of the drawings, the printer may also be constructed to apply on each label notice 29 that it is time to reorder a supply of the material being labeled. This notice may be combined with the indicia 26, 27 or 28 indicated in FIGS. 2, 3 and 4, respectively. When the web is punched at this place, both the notice and the indicia will be removed from the web.

The means at station C for verifying the label may include, as is shown in FIGS. 1 and 7 of the drawings, a master plate 30 secured to a guide plate 31 for the web 10 as by bolts 32 and so that it overlies the path of travel of the web 10 on the guide plate 31. The master plate 30 is preferably identified by a code number 33 with the product whose labels it has been designed to verify. The master plate 30 may further be provided with a sample 34 of the label which it is to verify in the operations of the machine, thus facilitating its handling. Formed in the master plate are two holes, 38, 38 arranged to expose the areas of the web in which will be provided the pairs of verification dots 28 applied thereto at the printing station B in a period of dwell of the web or in a printing press if the labels are pre-printed. The holes 38, 38 will exactly register with associated verification dots 28 when the particular label to be verified stops at station C in its feed through the machine, as is indicated in FIG. 7.

Mounted on the master plate 30 is a suitable photoelectric registering control device 39 of known construction and capable of projecting light beams simultaneously through both of the apertures 38. The photoelectric device controls a microswitch 40 which forms part of the electrical circuit of the machine and controls the operation of an electric motor (not shown) which drives the main shaft of the machine, in a known manner.

It will be understood from the foregoing, that when a label comes into registration with the master plate 30 in the step-by-step movements of the web advancing through the machine, the verifying dots 28 in the area between the labels at one end of the registered label will come into exact registry with the holes 38 in the masking plates 36. If this occurs the label is verified and the machine will continue to work. However, if one or both dots 28 on the label do not match the holes 38, light will shine through and cause the machine to be shut down. This means therefor provides an effective and reliable method for rejection of a label if the label is improper. As has been indicated, the verification dots 28 may be eliminated from the web before the label is applied to the bottle.

It will be understood further, that the arrangement of the dots and the viewing holes may be considerably varied so that the same sized label may be used for a large variety of products. It is also within the contemplation of the invention to use one or more than two holes 38, or even to use the photoelectric control device without the holes or even the master plate. The advantages of the master plate, however, in assuring a "fool proof" verification of the labels and in enabling the control device to be mounted on it so that there is no adjustment necessary for lights in mounting a particular plate on the machine, make it desirable to include it in the machine.

The label which has been verified at station C advances to station D as the operation of the machine continues until it comes into registry with slot punching mechanism located at station D in a dwell period of the web feed. As is indicated in FIG. 1 of the drawings, the slot punching mechanism may comprise a pair of knives 43 on which the label comes to rest and between which operates the slot cutting punch 44. The punch may be intermittently operated to cut the web in the dwell periods of the web feed by a link 45 connected thereto and a crank 46 provided on one of the driven shafts of the machine. The punch 44 may have associated therewith spring controlled members 47, 47 arranged to coact with the knives 43, 43, to clamp the web in position during the cutting operation.

The slot punching mechanism may be designed to cut slots of different configurations in the web. Thus in the portion of the web shown in FIG. 2 of the drawings, such mechanism has been designed to cut simple paired slots 50, 50 in the ends of the areas between the labels. In the web shown in FIG. 3 of the drawings, the punching mechanism was of a construction to cut slots 51, 51 in the sides of the body of the label and a central opening 52 in the area between labels, and at the same time to cut the web to produce a label shape whose sides and corners are of curved configurations. The web of FIG. 4 shows simple elliptically-shaped openings 53 provided in the central portion of the area between the labels. It will be noted that in this construction, the verifying dots 28 have been removed with the production of the elliptical openings 53. In the web of FIG. 5 there is produced the combination of a central elliptically-shaped opening 54 and aligned end slots 55, 55 in each area between adjacent labels. Many other variations in the form and number of slots and openings may be produced either in the area between the labels, or in the bodies of the labels, and other configurations of labels may also be produced.

The voids which are left in the web by the material removed therefrom at the punching station D and which are either in the form of edge slots or center openings, are utilized to control the web drawing action of a pair of feed rolls 60, 61 located at station E. The upper feed roller 60 has a plain uninterrupted surface which if laid flat would have the form of a rectangle. The circumference of this driving surface of the upper feed roll 60 is equal to the maximum length of label which the machine can handle. As the length of a label is considered to extend from the center lines of adjacent repeated cutouts either in the form of slots or openings in the areas at each end of a label, the active length or circumference of the driving surface of the upper feed roll 60 is greater than the distance between the trailing edge of the cutout at the leading end of the label of maximum length that the machine can handle and the advancing edge of the following repeated cutout at the other end of such maximum length label. Providing the upper feed roller with such maximum circumference enables it to be employed in handling all labels within the range of the machine.

The lower feed roll 61 has at least one circumferential portion thereof which is continuous throughout 360° and which is substantially greater in length than the circumference of the driving surface of the upper feed roll 60. This continuous circumferential portion which is designated 62 in the roller 61' shown in FIG. 8 of the drawings, and which is designated 63 in the roller 61", is located on that portion of the roller over which will travel a length portion of the web that is periodically separated by the cutouts (note the web portion indicated by the numeral 64 in FIG. 8 and the web portion indicated by the numeral 65 in FIG. 9). It will be noted that the surface portion 62 is located centrally of the roll 61' because it has been designed for a web having centrally aligned cutouts 53 as in the web shown in FIG. 4. The surface portion 63 of the roll 61" is located on an end portion of such roll because the slot cutouts 50 of the type shown in FIG. 2 are repeated along an edge of the web. As the web of FIG. 2 also has slot cutout 50 along its other edge, the roll 61" preferably also has a continuous circumferential portion 63' at its other end portion. These continuous circumferential roll portions may be located in other portions of the roll depending on the arrangement and design of the cutouts in the web.

If the web has one complete cutout, or a plurality of aligned complete cutouts, in each length of the labels along a longitudinal portion or portions of the web, the lower feed roll 61 is provided with one or a plurality of aligned transverse bar like surfaces which are located the the same radial distance from the axis of the roll as the continuous circumferential surface portions of the roll. The number of aligned transverse bar surfaces on the roll will depend on the number of uninterrupted longitudinal portions of the web resulting from the punching operation at station D. Thus in the type of web shown in FIG. 8 provided with a central series of holes 53, there are left two side longitudinal portions 65, 65 of uninterrupted web material. Consequently there are two of said transverse bars 66, 66 porvided in aligned relation on the end portions of the roll 61'. In the type of web shown in FIG. 9 provided with two side series of slots 50, there remains only a central longitudinal portion 67 and therefore only one of said transverse bars 68 is needed. The remainder of the circumferential surface portions of the roll 61 will have radii less than those of the working surfaces provided by the continuous and bar portions thereof. Thus in the roll 61' of FIG. 8 the radii of the circumferential surfaces of the remaining roll portions 69 and 70 will be less than the radii of the working circumferential surfaces of the roll portions 62 and 66. In a similar fashion the circumferential surfaces of the remaining portions 71 of roll 61" in FIG. 9 will have radii less than three of the circumferential surfaces of portions 63, 63' and 68 of such roll 61". As a consequence the working or active surface of the roll 61' of FIG. 8, if cut at a place opposite the portions 66 thereof and flattened out would have the form of a plus sign, while that of the roll 61" of FIG. 9 if cut midway of the portion 68 thereof and flattened out would have the configuration of a hollow rectangle.

It will be noted from the enlarged sketch designated FIG. 10 that the under cut of the recessed surface portions 69 and 70 may be greater than the thickness of the web 10 so as to prevent any possibility of such surface portions cooperating with the working surface of the roll 60 to feed the web. Such a condition will always be necessary in those installations in which the rolls are mounted in fixed, substantially rolling engagement. This condition however is not required if the roll supporting means are such as to enable the rolls to be spaced a predetermined distance apart as illustrated in FIG. 10.

It will be understood from the foregoing, that the circumferential dimension of the driving or working surface 62 is such that that portion thereof outside the region of the aligned bars 66, 66 is adequately able to advance a web one label length, or the distance between the center lines of adjacent openings 53 in the series thereof, even though such web is provided with the maximum length of label which the machine can handle. With smaller length labels such portion of the circumferential dimension of the working surface 62 will obviously be much greater than the distance between the center lines of adjacent openings 53 in the series thereof. Thus, one revolution of the roll 61' would feed more than one of any of the labels capable of being handled by the machine if it were not for the special construction of the labels themselves in accordance with the invention.

When the roll 61' is operating in cooperation with the roll 60, it will coact with the latter to draw the web so long as the portion 62 thereof is in engagement with web material in the longitudinal portion 64 of the web. As the surfaces of roll portions 69 and 70 are spaced from the driving surface of roll 60 a distance greater than the thickness of the web material, such surfaces will take no part in the web feeding operations of the rolls 60 and 61'. As soon as the leading edge 53' of the slot 53 advancing between the rolls 60, 61' passes the bight of the working surface of roll 60 and the working surface of the portion 62 of the roll 61', the feed of the web will stop. The feed rolls 60 and 61' are running continuously so that even though the web has stopped their rotating movement does not cease. It will be observed from a comparison of FIGS. 8 and 10 that during this condition, the side edge portions of the working surface of the roll 60 will be opposed by the surfaces of the portions 69 and 70 of roll 61', while the bight of the central portion of the working surface of roll 60 and the opposed surface of portion 62 of roll 61' will be located in the area defined by the opening 53. As a result, no part of the rolls 60, 61' can cooperate to advance the web. This condition will be maintained until the transverse surface portions 66 advance to provide a bight between the latter and the side edge portions of the working surface of roll 60 beyond the ends of the opening 53. This bight will take effect on the longitudinal portions 65 of the web and cause the latter to be advanced. The widths of the surfaces 66 are sufficient to enable this supplementary feed of the web to continue until the following edge 53" of the opening (FIG. 10) passes into the bight between the central surface portion of roll 60 and the working surface of portion 62 of roll 61'. Preferably the widths of the surfaces 66 are wide enough so that the bight between the central portions of the rolls takes effect before the bight between the edge portions of the rolls is discontinued. The main web feeding components of rolls 60 and 61' then cooperate to continue the feed of the web until the next succeeding opening 53 passes between such rolls.

It will be noted that in each cycle of the roll 61', the feed of the web is initiated while the opening 53 is located between the two rolls and when the supplementary bight is produced between the edge portions of the rolls. Once initiated the feed of the web is smoothly taken over by the central portions of the rolls and continues until the leading edge 53' of a succeeding opening 53 passes the bight of such central roll portions. The period of dwell will depend on the length of time it will then take the transverse surfaces 66 to advance to a position at which the supplementary bight is produced between such surfaces and the working surface of roll 60. This period of dwell can be determined for any particular label by providing the portion 62 with a given circumferential length. In this period of dwell and as soon as the leading edge 53' of an opening 53 passes the bight of the central roll portions, means are operated to cause the punching mechanism at station D to punch the next slot or opening 53 in the web and to cause the printing mechanism at station B to perform a printing operation on the web. At this time also a label is subjected to a certifying action at station C and cutting and label applying actions at stations F and G, respectively, are caused to be performed.

It is believed also that it will become more clear from a consideration of the label cutting operation that the accuracy of registry of the machine is built into the mechanism through the exact distance which is established from the edge of the punch to the bight of the feed rolls 60 and 61 as that is the only thing that determines the distance fed. To change the length of the label feed, as when different sized labels are to be utilized in the machine it is only necessary to shift the punch in relation to the feed rolls and then adjust the knife and printing setups accordingly. However, once the distance between the feed rolls and punch is established, there is nothing to interfere with the accuracy of register. There is no hunting or floating of register as is usual with other devices such as the known electric eye systems. The control is positive and decisive and is effected through the cutouts themselves. Thus the paper web is utilized in the machine as a physical link or machine part that controls its own preparation.

The mechanism for continuously driving the feed rolls 60, 61 is shown more in detail in FIGS. 11 and 12 of the drawings. It will be noted in such figures that in its passage to the rollers 60, 61, the web 10 passes between a guide plate 75 and a finger 76 designed to permit the passage of the web to the rolls, but to cooperate with plate 75 to prevent any rearward movement when the web is released from the bight of the rolls due to the presence of cutout therebetween as above explained. The shaft 77 on which the finger 76 is mounted also freely supports in pivotal relation one end of a bracket frame 78 provided at its other end with spaced shaft supporting members 79, 79 to which are secured a fixed shaft 80 on which is rotatably mounted in any suitable fashion the roll 60. It will thus be understood that the roll 60 is freely rotatable about its own shaft 80, is freely translatable as a whole about shaft 77, and rests by reason of its own weight and that of the bracket unit 78 on or in the proximity of roll 61. The degree of engagement of roll 60 with roll 61, or the spacing between such rolls may be controlled by a pair of downwardly projecting adjustable stops or set screws 81, 81 carried by frame 78 and engageable with a pair of spaced supports 85, 85. The finger 76 is fixed to shaft 77 and is pivoted out of engagement with the web 10 when the roll 60 is lifted from its fully lowered position over the roll 61.

The roll 61 is mounted on the previously referred to shaft 19 which is rotatably supported by bearings 86, 86 provided on the upper end of a yoke 87 mounted on the frame of the machine. A tension spring 88 secured to such yoke and the bracket frame 78 normally tends to maintain the rolls 60 and 61 in operable relation for drawing the web 10. Also supported by the yoke 87 is a bracket member 89 extending in parallelism and in spaced relation below roll 61. On the outer end of member 89 is an index member 90 of triangular shape and with its apex cooperating with an arrow 91 on roll 61. The arrow 91 is aligned with the index member or pointed 90 after every change in the length of label. The relation of these two elements 90, 91 determines the timing of the feed of the label to the cutoff mechanism at station F.

The shaft is provided on its other end with a chain gear 93 which engages in driven relation an endless chain 94 carried by three chain gears 95, 96 and 97. Chain gears 95 and 97 are mounted for rotation about fixed pivots, while chain gear 96 is adjustably mounted on the frame of the machine to permit of variation in the tension on chain 94. The shaft 98 to which chain gear 97 is affixed, has also secured thereto a driven gear wheel 99 that is connected by suitable means including a chain 100 to the main drive shaft of the machine.

The feed rolls 60, 61 may have associated therewith means for registering given portions of the labels for the printing operation accomplished at station B. It will be noted from a comparison of FIGS. 1 and 11, that such means may include a pair of auxiliary rolls 105, 106 located in advance of the main feed rolls 60, 61 and constructed and arranged to function in the nature of a clamp to grip the web 10 in the dwell of rolls 60 and 61. The roll 106 is located slightly below the path of feed of the web 10 and is continuously driven through a pulley roll 107, belt 108 and pulley roll 109 secured to the shaft on which is mounted chain gear 95. Roll 105 is rotatably mounted on a shaft 110 carried by a solenoid 111 which is connected by electric wiring 112 to the microswitch 16. Thus every time the microswitch 16 is actuated by cam 18, the roll 105 which is normally raised from the web will be advanced downwardly to clamp the web against roll 106 to draw the web through the rolls 60, 61 in a dwell period. The solenoid 111 controlling the movement of roll 106 is of a construction that it will maintain the roll 105 in clamping position for a given period sufficient to advance the web from the position in which it has stopped as a result of the leading edge of the central contact passing the bight of rolls 60, 61 to a position in which a given position of a label located at the printing station B will come into exact registry with the printing means thereat. Preferably when this supplementary means is incorporated in the machine, the cutouts are made sufficiently wide to prevent the rolls 60, 61 restarting the feed of the web as a result of the supplementary drawing action of the rolls 105, 106.

When in the normal operation of the machine, the feed of the web is resumed by the feed rolls 60, 61, the leading label in the web is moved into position at station F to be severed from the web by the cutting instrumentalities located thereat. The cutting mechanism may be of any suitable construction known to the art and may be composed of a single cutting blade 120 and die 121, as is indicated in FIG. 1 of the drawings, to make a straight transverse cut across the web as is indicated by the line of cut designated 122 in FIG. 3 of the drawings. The cutting blade may also be constituted of a double bladed knife and suitable associated dies known to those skilled in the art, to make a double parallel transverse cut across the web as indicated by the pair of lines of cut designated 123 in FIG. 4 of the drawings. A cut of this type will simultaneously remove from the web and the severed label the area between the labels proper in which are located the registering cutouts 53. The cutting means may also be in the form of round punches as indicated by the dotted lines 124, 124 in FIG. 5 to sever connecting portions of the web between aligned cutouts 54 and 55 in the area between connected labels. When the label is provided with the form of cutouts 125 illustrated in FIG. 6 of the drawings, either of the aforesaid cutting methods may be employed to equal advantage.

As has been previously indicated, the cutting instrumentalities as well as the main feed rolls 60, 61 may be movably mounted on the machine so that they can be adjusted relative to each other to cause the labels to be presented in registry to the printing station B, the slot punching station D and the label applying station G. Preferably the cutting devices and feed rolls should have an adjusted position relative to each other such that the center line of the feed rolls and the center line of the cut made in the web will coincide with the center lines of two of the cutouts contained in a longitudinally extending series thereof on the web. The cutouts need not be adjacent cutouts in the series but should be repetitious of the same cutout. Thus in a web such as depicted in FIG. 13 of the drawings on which are printed front labels 126 and back labels 127 in alternate fashion, and which therefore is provided with cutouts 128 and 129 to control the feed of the front and back labels, respectively, the center lines of the cutouts 128 will be taken as controlling the locations of the feed rolls and cutting knife. Accordingly, such devices may be so located relative to each other that the center line of the feed rolls will be positioned at the line 130 and the center line of the knife cut will be positioned at the line 131. FIG. 13 also illustrates that the feed rolls are capable of accurately feeding to cutting mechanism labels of different lengths on the same web provided that the control cutouts are applied to the web according to a given repetitious arrangement conforming to a repetitious order of the labels.

In the embodiment of the invention shown in FIG. 14, the feed roll 135 is mounted for rotational movement about the axis of a shaft 136. Also secured to shaft 136 is a pinion 137 engaged with a rack 138. The rack 138 is suitably connected to a cam in a manner well known in the art to provide it with a reciprocating motion as is indicated by the arrow 139 in such figure. As a result of the reciprocating motion of rack 138 the feed roll 135 will be oscillated about the axis of shaft 136. The length of the reciprocating stroke of rack 138 is such that the feed roll 135 will be oscillated through an angle of less than 360°.

The upper or idler roll 140 is mounted on a shaft 141 provided on the outer end of an arm 142 which is supported at its other end for pivotal movement about an axis 143. The roll 140 therefor rests by its own weight on roll 135 and can be pivotally swung away from such operative position by retracting arm 142 about its pivot 143. Connected at one end to shaft 141 is a reciprocable member 144 operable by suitable cam means in a manner well known in the art to move the idler roll 140 into and out of bighting position with the feed roll 135. The arrangement and construction of the parts are such that the feed roll 135 is oscillated in the direction of the arrow thereon when the rolls are in bighting relation as shown in FIG. 14 to move the web 10 to the left as viewed in such figure, and is oscillated in the opposite direction when roll 140 is swung away from roll 135 by the member 144. In such a construction it is not necessary that the feed roll 135, which corresponds to previously described roll 61, be provided with transverse bar like working surfaces like the latter, or that the web be provided with cutouts, as the control of the feed of the web by roll 135 will depend entirely on the timing of the cams controlling the members 138 and 144.

It will be also apparent that the transverse bar working surfaces of feed roll 61 may be eliminated therefrom if the feed rolls 60, 61 are constructed and arranged to be moved along the path of feed of the web to resume the bight of the web after each feeding of an individual label in the web. This result can be accomplished in the construction shown in FIGS. 11 and 12 by mounting the yoke 87 for slight slidable movement on the longitudinal framepiece 150 so that the entire roll assembly may be shifted lengthwise of such framepiece. The shifting action may be accomplished by an actuating member 151 shown in dotted outline in FIG. 11 and connected in a known manner to a cam capable of imparting slight reciprocal movement thereto. The cam should be designed to move the assembly to the right, as viewed in FIG. 1, to enable the bight of the rolls beyond which the leading edge 53' of the cutout (note FIG. 8) has advanced, to move in a direction opposite to that of the web feed to engage the trailing edge 53" of such cutout and thereby recommence the feed of the web. The assembly should be returned to its starting position after such feed has recommenced and before the next cutout approaches the rolls 60, 61.

It is believed it will be understood from the foregoing description of the mechanism of this invention that due to the act of forming a succeeding cutout in the web at the same time a preceding cutout is controlling the operation of the feed rolls 60, 61 exact registration is built into the web as it progresses toward the feeding and cutting stations. This accuracy of registration can be rendered absolutely certain to a fine degree at the cutting station by designing the cutting mechanisms to exert a registering action on the web as the knife is being actuated for its cutting action at the same time and in the same portion of the label at this station. This object of the invention may readily be accomplished by providing the knife with label registering means in advance of the blade thereof and cooperable with the cutouts in the web to register the portion of the web to be cut just prior to the time the knife cuts.

As is shown in FIGS. 15 and 16 of the drawings the aforesaid registering means may comprise in a double cut knife 155 at station F, a pair of tapered registering guides 156, 156 arranged to engage with control slots 157, 157 in FIG. 17 provided along the side edges of the web 158 as in the manner of the slots 50 in FIG. 2 and slots 55 in FIG. 5. The guides 156 are formed on blocks 159, 160 which are removably mounted on downwardly projecting extensions 161, 161 of the knife by any suitable means such as the threaded bolts 162. The extensions 161, blocks 159, 160 and guides 156 are located in advance of the cutting edges 163 of the knife. While the guides 156, 156 may have the same transverse dimension for a given size of side slots, the blocks on which they are provided may have a transverse dimension depending on the width of the label to be processed through the machine (compare block 159 which may be suitable for a 4″ wide label and block 160 which may be suitable for a 2″ wide label).

The sides of the guides 156 are tapered to enable them to readily enter the label slots 157 and by their engagement with the leading and following edges of such slots to exactly register the web for the cutting operation. Preferably for this operation, the terminal label 167 is overfed by a distance 166 indicated by the space between the lines 164, 164 which indicate the positions of the cutting edges 163 on knife 15, and the lines 165, 165 which indicate the actual lines of cut which will be made in the web by the knife. This overfeed provides sufficient looseness in the web so that the registering guides 156 can function to bring the web into exact registration for the cutting operation. Thus after the terminal label on the web has been fed by the rolls 60, 61 to the position indicated in FIG. 17 relative to the knife 155 and the knife descends to cut such label from the web, the guides 156 will enter the slots 157 in their path and cause the web to be shifted back slightly (the distance 166) to bring the lines of cut 165 into registration with the knife blades 163. The web therefore will be in a slightly buckled back condition when the knife descends to sever the web along the lines 165, 165.

FIG. 18 shows the manner in which a centrally located registering guide 156′ is mounted on the knife 155′ to process labels which have been provided with a central cutout in the manner of the cutouts 53 shown in FIGS. 5 and 8 of the drawings. The guide 156′ is tapered in the manner of the guide 156 and functions in a similar manner to accomplish the combined registering and cutting operations at the cutting station. As a result of this combined operation, the severing cuts will have an accuracy within thousandths of an inch and such that it is impossible with the naked eye to ascertain the jointure of the lines of cut 165, 165 with the preparatory cuts 168, 168 in FIG. 17 made at the punching station in providing the labels with round corners.

The severed terminal label 167 is then picked up by a vacuum device 170 of a known construction and delivered by the latter to a pickup station 171 where it is again picked up by a label applicator 172 and applied to the bottle 14. The vacuum device 170 and applicator 172 may form part of a known dual pickup label carrier, as shown, so that as a label is being delivered by the device 170 to station 171, the applicator 172 is simultaneously delivering a previously deposited label from station 171 to the bottle 14.

While I have herein illustrated and described preferred embodiments of my invention, it will be apparent to those skilled in the art that changes and variations in such embodiments may be made without departing from the spirit of the invention or the scope of the appended claims.

It will be also understood, that while I have depicted in FIG. 1 of the drawings for the purposes of illustration, a complete system embodying the above described features, the system need not be used in its entirety to gain the benefits of the invention, but only certain of such features may be assembled in accordance with the results to be obtained and may be used in part at one location and in part at another location and when so used certain features of the system may be duplicated in both parts. Thus, in accordance with the invention one system or machine may be devised to print the labels for use in one or more other machines or systems. To accomplish this, a machine for preparing a roll of labels may embody means A for supporting a supply roll of label web, printing means B, slot cutting means D and feed rolls E; while another machine for applying the labels from such roll may embody a supply roll supporting means A, verifying means C, feed rolls E, label cutting means F and label applying means G. The label cutting means F may be of a type shown in FIGS. 15, 16 and 17 to provide an even more precise registration of the terminal label, or constructed merely to sever the terminal label from the web, as by slitting the web or removing a section or sections of the web material. As has been previously indicated, a cutting means constructed to perform this latter operation is of advantage in removing from the web at the same time the label is severed, the various indicia which may have been applied to the web for informative or verification purposes. Such a cutting operation is also useful in removing the "bleed" that may occur between two printing plates when the entire area of the web is provided with distinctive label coloring of different colors. Thus, as is indicated in FIG. 7, each label may be composed of two background colors, for example, blue 21 and green 22. In labels so formed, the contrasting colors of adjacent labels are likely to overlap in the printing operation to provide at the juncture 23 of the labels a combined color, which is termed "bleed" and is undesirable. By cutting along the lines 24, 24 in the manner indicated this "bleed" can be removed, as well as any indicia that might be in the web section between such lines of cut.

Other advantageous arrangements of the system may be formed without the verifying means C and without the feed rolls of FIGS. 7 to 10, using instead of the latter, for example, the feed means shown in FIG. 14; and may be constructed merely of means A for supporting a supply roll of label web, feed rolls E, label cutting means F and label applying means G. In this latter arrangement, the web may be provided only with notches or slots, which may be applied along an edge portion of the web of labels, or in between the labels, for controlling the feed of the web, and the registration of the terminal label. As has been previously indicated, the spacing of the notches or slots in the web are related to the lengths of the label or labels in the web and also to the position of the feeding means with relation to the cutting means. Thus, the cutting means should be positioned from the feeding means a distance consisting of a multiple of whole given units of distance, which units may be a multiple of the length of the label, or a quarter or one half of such label length. If the labels on the web are all one size, such distance will be preferably, at least the length of one of such labels. On the other hand, if the web is provided with a plurality of labels of different lengths, in sequence, as is the web shown in FIG. 13 of the drawings, the cutting means should be spaced in advance of the centerline of the bight of the feed rollers a distance equal to the sum of the label lengths in a sequence. With the parts so positioned, the feed rolls disclosed will be enabled to exactly register the labels at a fixed place for cutting even though the lengths of the labels, and the distances between the feed control slots on the web, vary. The aforesaid same principles of positioning will apply also in the positioning of the feeding means with relation to the slot forming means D, and to some extent with the relation of such feeding means with the vertifying and printing means if these are included in a machine or system.

What is claimed is:

1. The method of labeling containers for a given product, which comprises feeding toward the place for application of the labels to such containers, a continuous length of label web having provided thereon labels for such given product and control elements constituting verification marks associated with such labels so that such control elements and the portions of the web at which such elements are located provide a combination unique with respect to the particular labels on the web for such product and different from such a combination provided on a web bearing labels for a different product, and as such label web is fed toward said place of application verifying the correctness of such particular labels by successively scanning the control element bearing portions of the web to determine if there are provided thereat the particular control elements for the particular type of label on the web to be applied to containers for such given product, and if any label does not have associated therewith the proper unique combination for such given product, stopping the feed of the web to prevent such label being applied to a container for such given product at the place of application, successively severing from the web labels which have been verified and advanced to the place of severance thereof, and transferring the severed verified labels to the place for application thereof to the containers for the given product.

2. The method defined in claim 1, including the step of initially printing on the web labels for the given product and simultaneously with the printing of such labels, printing the particular control elements for the given product on said particular portions of the web.

3. The method of labeling containers for a given product with labels having rounded corners which comprises feeding a label web having labels printed thereon so that they are separated by a given amount of web between individual labels, toward the place for application of such labels to containers for such given product and at a point in the travel of the web toward such place for application successively notching the sides of such given amounts of web to produce rounded corners on the corners of the labels connected by such given amounts of web and to a distance in from the edges of the web at least as deep as the round to be produced at such label corners, successively registering the notched given amounts of web in cutting position at a place for severance of the leading labels from the web, and then in the severing step removing each given amount of web connecting the leading label to the web by severing the ends thereof with two cuts tangent to the rounded corners produced on the labels by the notching step to provide successively individual labels having rounded corners, and transferring the severed rounded corner labels to the place for application thereof to the containers for the given product.

4. The method defined in claim 3, in which said given amounts of web between individual labels are provided with verification marks, and including the step of verifying the correctness of the labels associated with such verification marks by successively scanning such verification marks as the web is fed toward said place of severance of the leading labels from the web, said severing step removing the verification marks with the severed given amounts of web.

5. In a label machine, feed means for feeding through the machine a continuous length of label web having provided thereon labels for containers of a given product and control elements associated with such labels, the particular control elements and portions of the web at which such elements are located providing a combination unique with respect to the particular labels on the web for such product and different from such a combination provided on a web bearing labels for a different product, verifying means including means constructed and arranged to scan the web for said particular control element bearing portions of the web on which said control elements should appear to determine if such web portions are provided with the particular control elements for the labels to be applied to the containers for such given product, and said verifying means including means automatically operative when said scanning means thereof finds a label that does not have associated therewith the proper unique combination for such given product, to render the label machine inoperative to apply such label to a container for said given product, cutting means for severing from the web labels verified by said label verifying means, and transfer means for transferring the severed verified labels from said cutting means to a place for application to said containers for the given product.

6. In a label machine as defined in claim 5, in which said verifying means includes a verification plate overlying the label web feeding through the machine and having a given opening therein registerable with said control elements correctly located in said particular web portions therefor, said plate in the feed of said web successively blanking out the labels on said web except for such given opening thereof, and photoelectric means operable to direct a control beam through the opening of said plate.

7. In a label machine as defined in claim 5, including means for supporting a roll of label web, and printing means located between said supporting means and said verifying means for simultaneously printing on the web labels for said given product and said particular control elements for said product on said particular portions of the web.

8. In a label machine, a pair of feed rolls for feeding through the machine a continuous length of label web having provided thereon labels for containers of a given product and control elements associated with said labels and spaced apart on said web distances comparable to the lengths of the labels, cutting means at a fixed distance in advance of said feed rolls for severing the terminal label from the web when the web material connecting the terminal label to the web is in registration with said cutting means, means for actuating said rolls to advance the web continuously a distance comparable to the length of a label thereon and thereby to advance the web material connecting the terminal label to the web into registry with said cutting means, means cooperative with said control elements on the web enabling said feed rolls to exert a pulling grip on the web during such advancement of the latter, to release such pulling grip on the web each time the web is advanced through said distance, and to automatically restore such pulling grip on the web after a given interval in each interruption of the feed of the web, so that on each step of movement of the web it is moved continuously through a distance comparable to the length of a label thereof to successively bring the web materials connecting successive terminal labels into registry with said cutting means, means operative during each period of dwell in the feed of the web to cause said cutting means to operate to sever from the web the terminal labels advanced thereto by said feed rolls, and transfer means for transferring the severed labels from said cutting means to a place for application of the same to said containers for the given product.

9. In a label machine as defined in claim 8, in which said control elements associated with the labels are in the form of cutouts in the material of the web, and in which said means cooperative with said control elements comprises means on said feed rolls constructed and arranged to exert a pulling grip on the web until a cutout is reached, whereupon such pulling grip is released throughout such period of dwell, and to then automatically restore the pulling grip on the web after such period of dwell to restore the feed of the web until the next cutout is reached.

10. In a label machine as defined in claim 8, including punch means for punching successive spaced cutouts in the web to form said control elements prior to the engagement of said web by said feed rolls, and in which said cooperative means cooperates with said cutouts to control the pulling grip of said feed rolls on the web.

11. In a label machine as defined in claim 10, including means for printing on the web given indicia spaced apart thereon distances comparable to the lengths of the labels, said punch means being operable to successively cut out of the web said indicia provided thereon by said printing means to provide said successive cutouts.

12. In a label machine as defined in claim 8, in which said control elements associated with the labels are in the form of cutouts in the material of the web and the portions of the web material cut out to produce such cutouts contain verification marks, punch means for punching such cutouts in the web to form said control elements prior to the engagement of said web by said feed rolls, and verifying means cooperative with said verification marks to verify the labels associated therewith prior to the cutting out of such marks by said punch means.

References Cited by the Examiner
UNITED STATES PATENTS

| | | | |
|---|---|---|---|
| 2,725,101 | 11/1955 | Von Hofe | 83—278 |
| 2,946,281 | 7/1960 | Sohn | 156—384 |
| 3,084,621 | 4/1963 | Guastavino | 101—181 |
| 3,107,566 | 10/1963 | Archer | 83—33 |
| 3,199,450 | 8/1965 | Leavens | 101—426 XR |

EARL M. BERGERT, *Primary Examiner.*

HAROLD ANSHER, *Examiner.*